(12) United States Patent
Smith et al.

(10) Patent No.: US 6,834,353 B2
(45) Date of Patent: Dec. 21, 2004

(54) METHOD AND APPARATUS FOR REDUCING POWER CONSUMPTION OF A PROCESSING INTEGRATED CIRCUIT

(75) Inventors: Jack Robert Smith, South Burlington, VT (US); Sebastian Theodore Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/682,816

(22) Filed: Oct. 22, 2001

(65) Prior Publication Data

US 2003/0079150 A1 Apr. 24, 2003

(51) Int. Cl.[7] .............................................. G06F 1/32
(52) U.S. Cl. ...................................... 713/320; 713/300
(58) Field of Search .............................. 713/300, 320, 713/324, 340

(56) References Cited

U.S. PATENT DOCUMENTS

| | | |
|---|---|---|
| 3,626,427 A | 12/1971 | MacSorley et al. |
| 3,859,755 A | 1/1975 | Schaller |
| 5,394,558 A | 2/1995 | Arakawa et al. |
| 5,452,434 A | 9/1995 | MacDonald |
| 5,469,399 A | 11/1995 | Sato et al. |
| 5,742,833 A | 4/1998 | Dea et al. |
| 5,815,724 A | 9/1998 | Mates |
| 5,903,894 A | 5/1999 | Reneris |
| 5,941,991 A * | 8/1999 | Kageshima .................. 713/340 |
| 5,951,689 A | 9/1999 | Evoy et al. |
| 5,987,545 A | 11/1999 | Oh |
| 5,991,884 A * | 11/1999 | Lin et al. ..................... 713/300 |
| 6,002,878 A | 12/1999 | Gehman et al. |
| 6,025,741 A | 2/2000 | Ciraula et al. |
| 6,054,877 A | 4/2000 | Ventrone |
| 6,079,008 A | 6/2000 | Clery, III |
| 6,167,524 A | 12/2000 | Goodnow et al. |
| 6,173,408 B1 | 1/2001 | Jimbo et al. |
| 6,205,518 B1 | 3/2001 | Moore et al. |
| 6,237,101 B1 | 5/2001 | Moore et al. |
| 6,564,328 B1 * | 5/2003 | Grochowski et al. ........ 713/320 |
| 6,651,176 B1 * | 11/2003 | Soltis et al. ................. 713/300 |

FOREIGN PATENT DOCUMENTS

| | | | | |
|---|---|---|---|---|
| JP | 2000242676 A | * | 9/2000 | ........... G06F/17/50 |
| JP | 2000305671 A | | 11/2000 | |

OTHER PUBLICATIONS

"Power and Thermal Configurator for Personal Computer Systems", IBM Technical Disclosure Bulletin, Feb. 1, 1995, US, pp. 567–572.*

* cited by examiner

*Primary Examiner*—Lynne H. Browne
*Assistant Examiner*—Paul Yanchus, III
(74) *Attorney, Agent, or Firm*—Richard A. Henkler; Dugan & Dugan, PC (57) ABSTRACT

In a first aspect, a method is provided for conserving power in a processing integrated circuit. The method includes the steps of (1) calculating power consumption for executing an instruction and data corresponding to the instruction; and (2) executing the instruction if such execution does not exceed a predetermined power level. In a second aspect, a method is provided for conserving power in a processing integrated circuit employing a plurality of execution units. The method includes the steps of (1) comparing a total power to be consumed by the processing integrated circuit to a power budget for the processing integrated circuit; and (2) if the total power exceeds the power budget, freezing execution of an instruction by one of the plurality of execution units so as to allow execution of the instruction to continue at a later time from where execution was frozen. Numerous other aspects are provided, as are systems and apparatus.

27 Claims, 8 Drawing Sheets

METHOD AND APPARATUS FOR REDUCING POWER CONSUMPTION OF A PROCESSING INTEGRATED CIRCUIT

BACKGROUND OF THE INVENTION

FIELD OF THE INVENTION

The present invention relates generally to integrated circuits that perform data processing such as microprocessors, microcontrollers, logic circuitry, etc., and more particularly to reducing power consumption of such integrated circuits.

Modern day microprocessors, microcontrollers, logic circuitry, etc., (i.e., processing integrated circuits) consume a large portion of their power budget during AC operation (e.g., when circuitry is active and is processing instructions and/or data). While many power management techniques exist that attempt to reduce power consumption in sections of processing integrated circuits that are not in use (e.g., inactive sections of processing integrated circuits), maintaining a power budget for active sections of such circuitry remains difficult.

Most conventional techniques for budgeting power consumption of active sections of processing integrated circuits rely on reducing logic toggles through the use of multiplexers, or reducing logic toggles performed by control logic. For example, U.S. Pat. No. 6,054,877, which is hereby incorporated by reference herein in its entirety, discloses a "Transition-Once MUX" that may prevent multiplexer (MUX) output transitions for invalid data and reduce AC power consumption due to such "invalid" MUX output transitions. Likewise, U.S. Pat. No. 6,237,101, which is hereby incorporated by reference herein in its entirety, discloses a technique for reducing power consumption of a microprocessor during decoding of a current instruction by maintaining control signals at the values/levels determined during the decoding of a preceding instruction if it is not necessary to change the values/levels of the control signals to execute the current instruction.

Another conventional technique for controlling power consumption in portable personal computers is disclosed in U.S. Pat. No. 6,167,524, which is hereby incorporated by reference herein in its entirety. U.S. Pat. No. 6,167,524 discloses, for example, summing expected power consumption values of active execution units to determine whether an expected total power consumption exceeds an optimum battery power efficiency value. If so, the amount of execution unit activity is rationed (e.g., so that power drain remains within a regime of optimum battery/converter efficiency). (Col. 6, lines 47–61). The expected power consumption value for each execution unit may be based on an average toggling power associated within the execution unit as computed via simulation. (Col. 5, line 60–col. 6, line 3).

These and other power management techniques do not take into account the actual data being operated on during a current clock cycle, and/or do not allow for real-time power balancing, particularly once an instruction is dispatched to an execution unit. Accordingly, maintaining a power budget for active sections of processing integrated circuits remains difficult.

BRIEF SUMMARY OF THE INVENTION

In accordance with a first aspect of the invention, a method is provided for conserving power in a processing integrated circuit. The method includes the steps of (1) calculating power consumption for executing an instruction and data corresponding to the instruction; and (2) executing the instruction if such execution does not exceed a predetermined power level.

In accordance with a second aspect of the invention, a method is provided for conserving power in a processing integrated circuit employing a plurality of execution units. The method includes the steps of (1) comparing a total power to be consumed by the processing integrated circuit to a power budget for the processing integrated circuit; and (2) if the total power exceeds the power budget, freezing execution of an instruction by one of the plurality of execution units so as to allow execution of the instruction to continue at a later time from where execution was frozen. Numerous other aspects of the invention are provided, as are systems and apparatus.

Other objects, features and advantages of the present invention will become more fully apparent from the following detailed description, the appended claims and the accompanying drawings.

DETAILED DESCRIPTION OF THE INVENTION

Figure 1:
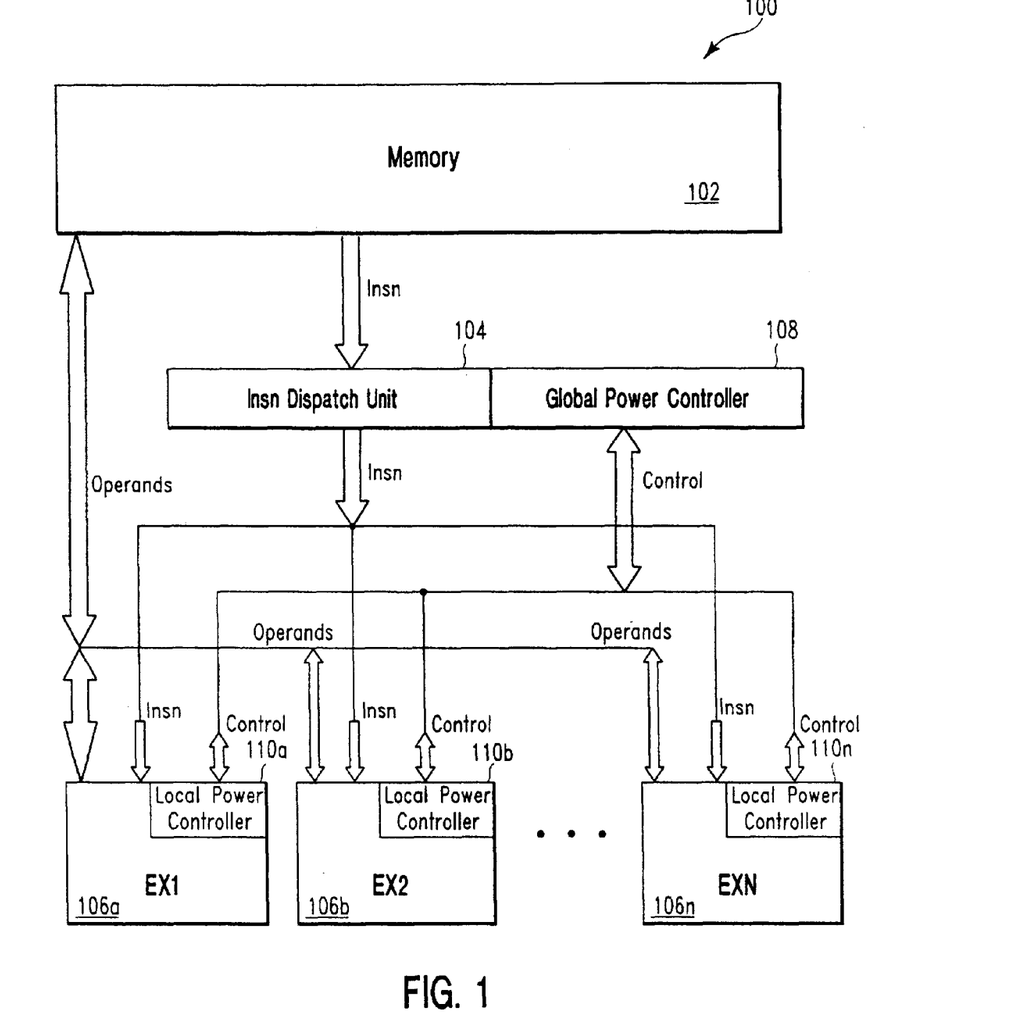
FIG. 1 is a schematic diagram of a novel data processing system configured in accordance with the present invention.

FIG. 1 is a schematic diagram of a novel data processing system 100 configured in accordance with the present invention. The data processing system 100 includes a memory 102 coupled to an instruction dispatch unit 104 and a plurality of execution units 106a–n. The instruction dispatch unit 104 includes a global power controller 108, and each execution unit 106a–n includes a local power controller 110a–n. The memory 102, the instruction dispatch unit 104, the execution units 106a–n and the global and/or local power controllers 108, 110a–n are configured to exchange various data (e.g., operands), instructions and/or other control signals as described further below.

The memory 102 and the instruction dispatch unit 104 may be conventional data processing system components as are known in the art. Exemplary embodiments of the global and local power controllers 108, 110*a–n* are described below with reference to FIGS. 2–6. An exemplary embodiment of one of the execution units 106*a–n* is described below with reference to FIGS. 7 and 8.

Figure 2:
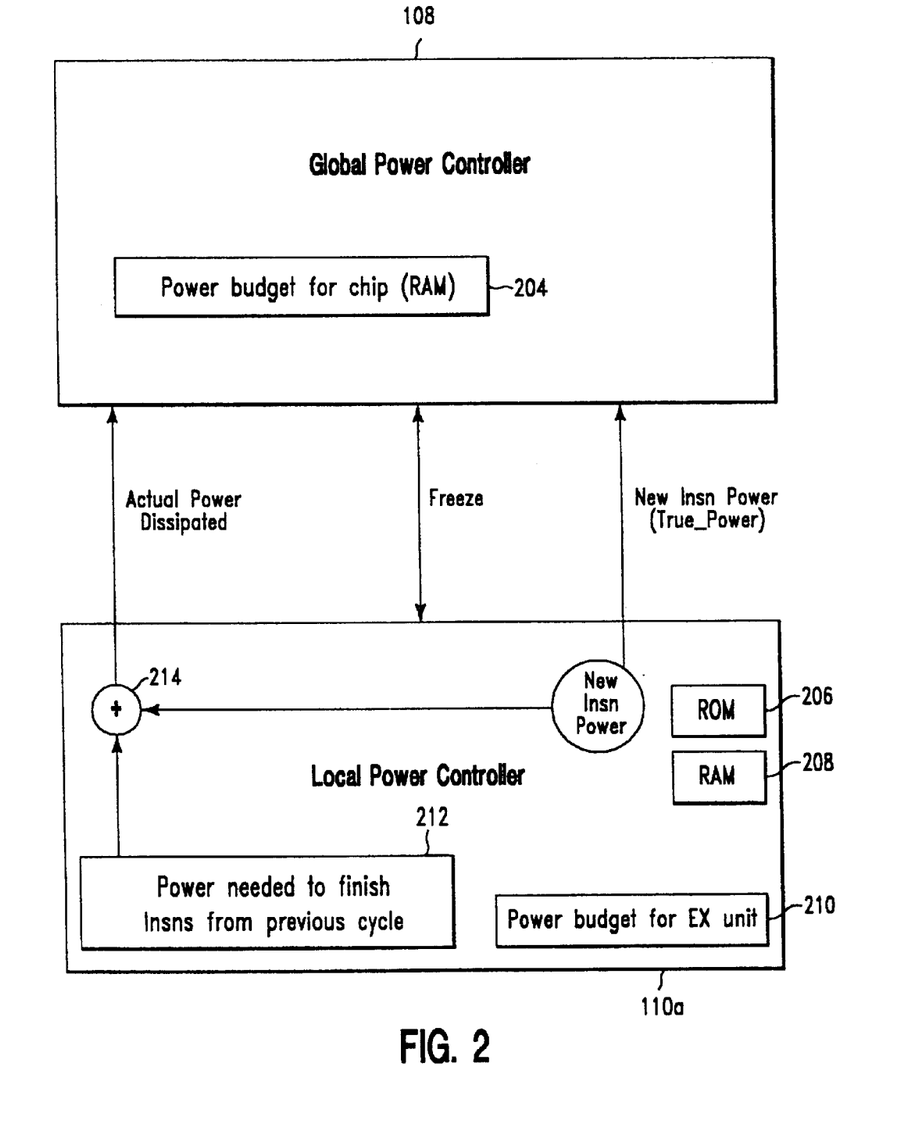
FIG. 2 is a schematic diagram of an exemplary embodiment of the global power controller of FIG. 1 in communication with an exemplary embodiment of the local power controller of FIG. 1.

FIG. 2 is a schematic diagram of an exemplary embodiment of the global power controller 108 in communication with an exemplary embodiment of the local power controller 110*a* of FIG. 1. The local power controllers 110*b–n* may be similarly configured.

With reference to FIG. 2, the global power controller 108 includes a register 204 adapted to store the total power budget for the data processing system 100. In one embodiment of the invention, the register 204 comprises a programmable register such as a random access memory (RAM), although another conventional register also may be employed. The total power budget for the data processing system 100 may represent, for example, the power required for maximum power efficiency in a battery operated system as described in previously incorporated U.S. Pat. No. 6,167,254, or any other predetermined power level as is known in the art.

The local power controller 110*a* includes a ROM 206, a RAM 208, a first register 210, a second register 212 and adder circuitry 214. The ROM 206 represents one or more ROMs adapted to store, for each executable instruction, (1) average or otherwise representative values of the power required for the execution unit 106*a* (FIG. 1) to execute the instruction; and/or (2) "typical" or otherwise representative operands for the instruction type (as described further below). Such average power and typical operands may be based on simulation (e.g., based on running application code with a physical capacitance based simulation tool which determines power consumed per cycle for each execution unit as described in previously incorporated U.S. Pat. No. 6,167,524 or using any other known technique).

The RAM 208 represents one or more RAMs adapted to store, for each instruction executed by the execution unit 106*a*, (1) the actual power that was required by the execution unit 106*a* to execute the instruction; and/or (2) the operands on which the instruction operated. The first register 210 is adapted to store the power budget for the execution unit 106*a*, and may comprise any conventional register such as a RAM. The power budget may be determined using any conventional technique. The second register 212 is adapted to store the power required to finish execution of a previous instruction that was halted or "frozen" as described further below with reference to FIGS. 3–8. The second register 212 similarly may comprise any conventional register, such as a RAM.

Figure 3:
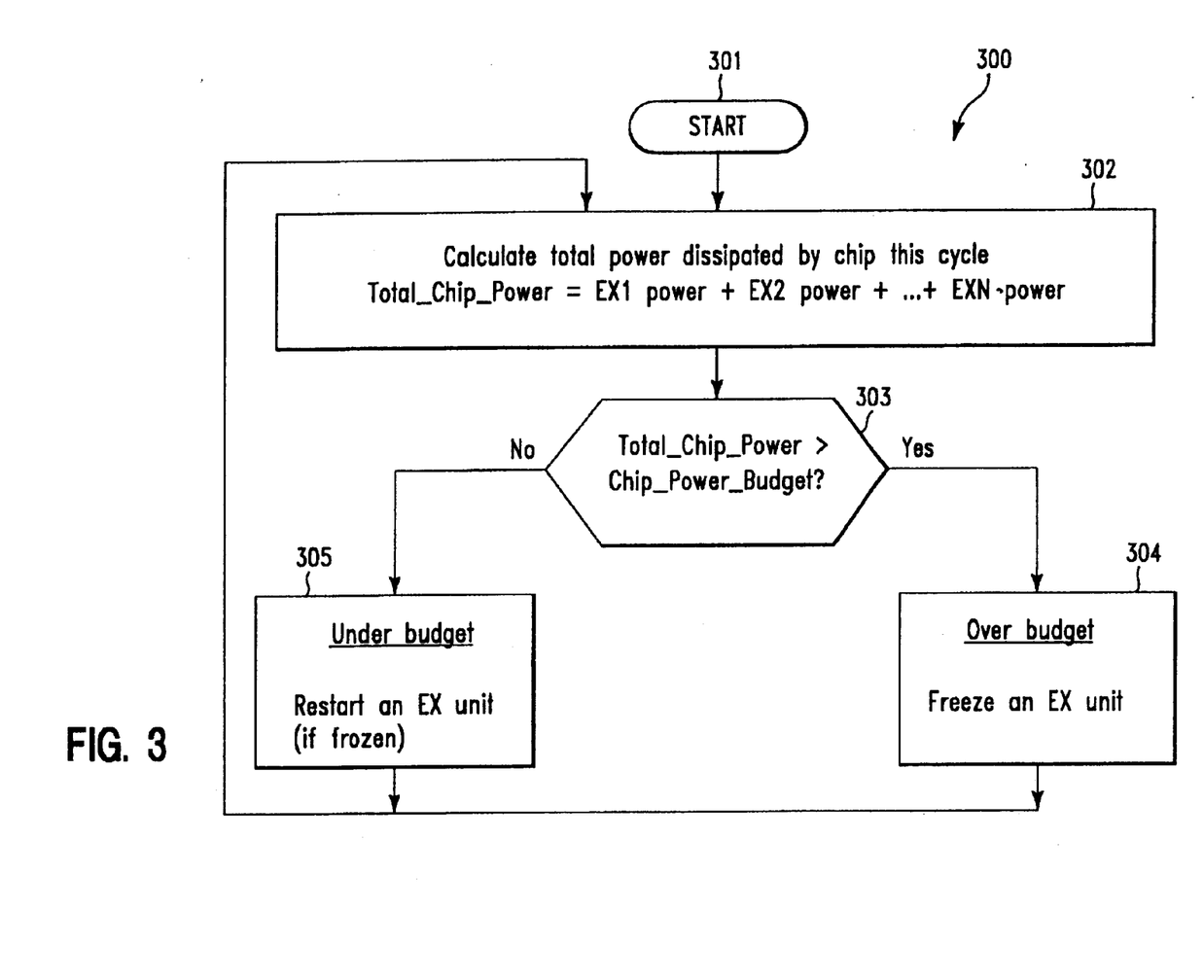
FIG. 3 is a flowchart of an exemplary process for conserving power that may be performed by the global power controller of the inventive data processing system of FIGS. 1 and 2.

FIG. 3 is a flowchart of an exemplary process 300 for conserving power that may be performed by the global power controller 108 of the inventive data processing system 100 of FIGS. 1 and 2. With reference to FIG. 3, the process 300 starts in step 301. In step 302, the global power controller 108 computes the total power to be dissipated by the data processing system 100 for the current clock cycle ("Total_Chip_Power"). The Total_Chip_Power is computed based on the actual power to be consumed by each execution unit 106*a–n* during the current clock cycle (e.g., by summing the actual power to be consumed by each execution unit 106*a–n* during the current clock cycle). The actual power to be consumed by each execution unit 106*a–n* during the current clock cycle may be determined and provided to the global power controller 108, for example, as described below with reference to FIG. 4.

In step 303, the global power controller 108 determines whether the Total_Chip_Power will exceed the power budget for the data processing system 100 ("Chip_Power_Budget"). The Chip_Power_Budget may be stored, for example, in the register 204 of FIG. 2 as previously described. If the Total_Chip_Power will exceed the Chip_Power_Budget, in step 304, the global power controller 108 halts or "freezes" one or more of the execution units 106*a–n* (e.g., to prevent the Total_Chip_Power from actually exceeding the Chip_Power_Budget during the current cycle). As described below with reference to FIG. 4, each execution unit 106*a–n* is configured so that it may be halted or "frozen" while an instruction is being executed, and later restarted at the same place where execution was halted. In this manner, the power required to finish execution of an instruction by an execution unit that has been frozen may be consumed at a later time when the data processing system 100 is not over budget. For example, if in step 303 it is determined that the Total_Chip_Power will not exceed the Chip_Power_Budget, in step 305 the global power controller 108 may restart one or more previously frozen execution units 106*a–n*. The data processing system 100 thus may employ dynamic, real-time power management.

Figure 4A:
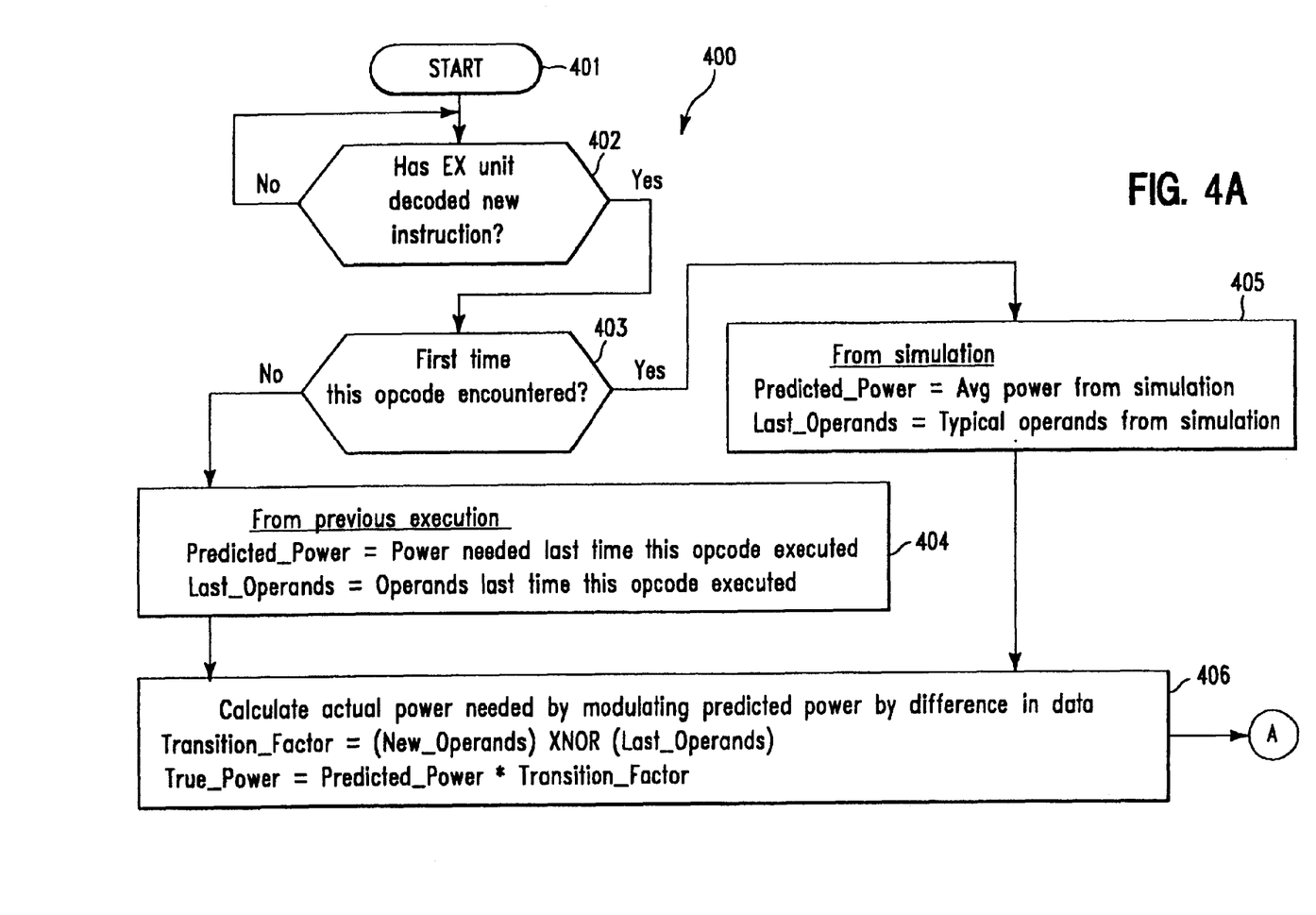
FIGS. 4A and 4B are a flowchart of an exemplary process for conserving power that may be performed by the local power controllers of the execution units of the inventive data processing system of FIGS. 1 and 2.
Figure 4B:
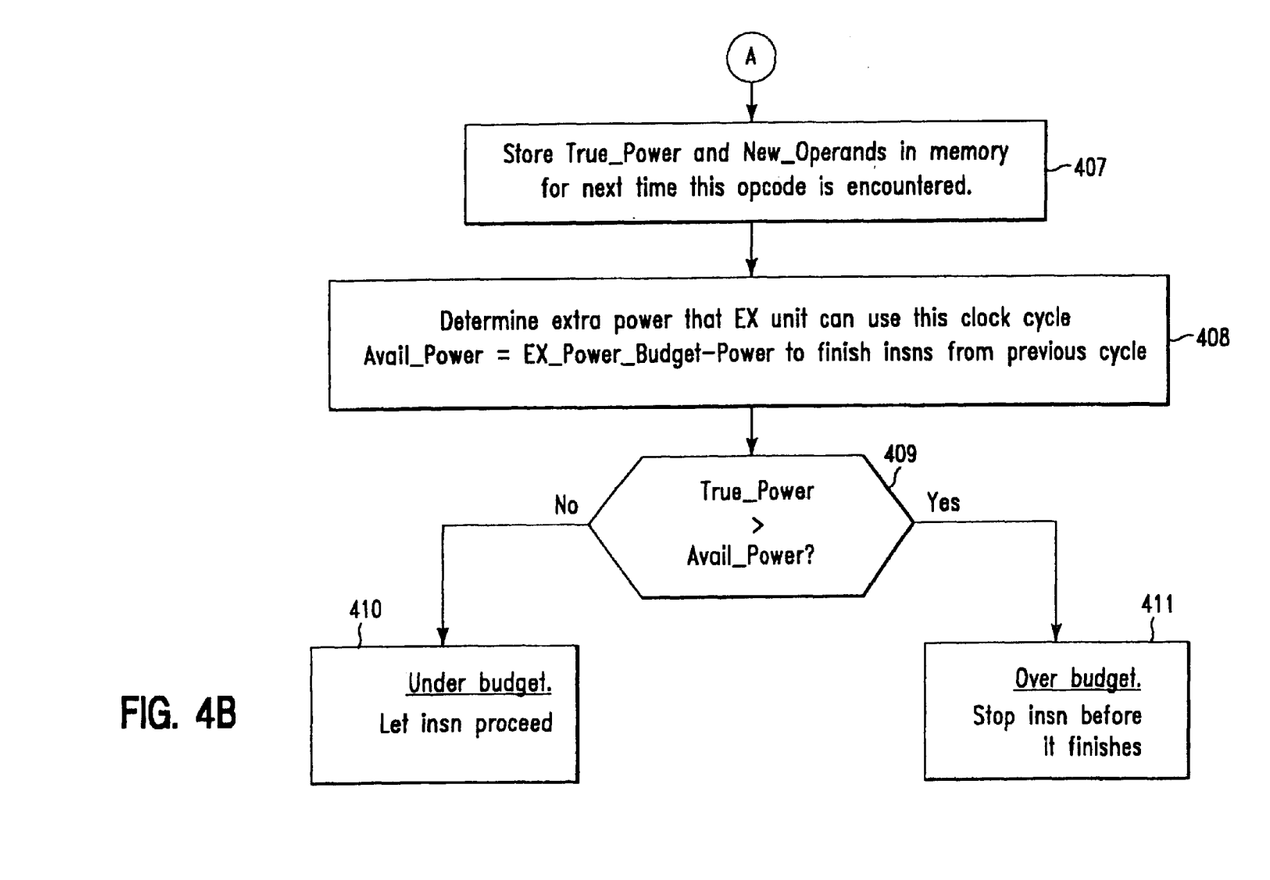

FIGS. 4A and 4B are a flowchart of an exemplary process 400 for conserving power that may be performed by the local power controllers 110*a–n* of the execution units 106*a–n* of the inventive data processing system 100 of FIGS. 1 and 2. For convenience, the process 400 is described with reference to the local power controller 110*a* of FIGS. 1 and 2. It will be understood that one or more of the local power controllers 110*b–n* may perform similar processes.

With reference to FIGS. 4A and 4B, the process 400 starts in step 401. In step 402, the local power controller 110*a* determines whether the execution unit 106*a* has received a new instruction from the instruction dispatch unit 104 and is decoding (or has decoded) the new instruction. If so, the process 400 proceeds to step 403; otherwise, the local power controller 110*a* re-checks whether the execution unit 106*a* has received a new instruction (step 402).

In step 403, the local power controller 110*a* determines whether the new instruction received by the execution unit 106*a* has ever been received previously (e.g., based on the operation code or "opcode" for the instruction). If so, the process 400 proceeds to step 404; otherwise the process 400 proceeds to step 405.

In step 404, the local power controller 110*a* determines a predicted power required to execute the new instruction ("Predicted_Power") based on the last time the instruction was executed by the execution unit 106*a*. For example, the RAM 208 (FIG. 2) may store the power previously required to execute the instruction. The local power controller 110*a* also determines the operands employed last time the instruction was executed ("Last_Operands"). The Last_Operands also may be stored in the RAM 208. The process 400 then proceeds to step 406.

If in step 403, the new instruction received by the execution unit 106*a* was not previously received by the execution unit 106*a*, in step 405 the local power controller 110*a* determines the Predicted_Power and Last_Operands based on simulation data (e.g., stored within the ROM 206 of FIG. 2). For example, the Predicted_Power may be an average power from a simulation, and the Last_Operands may be a typical operand employed during the simulation. Any suitable simulation techniques may be employed, such as those described in previously incorporated U.S. Pat. No. 6,167,524. The process 400 then proceeds to step 406.

In step 406, the local power controller 110*a* calculates the actual power required to execute the new instruction ("True_Power") based on the Predicted_Power. In at least one embodiment of the invention, the True_Power is calculated by multiplying the Predicted_Power by a transition factor ("Transition_Factor") that represents the results of an XNOR or other XOR-like operation performed on the actual operands associated with the new instruction ("New_Operands") and the Last_Operands as described further below. In step 407, the local power controller 110a stores the True_Power and New_Operands in the RAM 208 for use the next time that the instruction is executed by the execution unit 106a.

In step 408, the local power controller 110a calculates the available power that the execution unit 106a may use during the current clock cycle ("Avail_Power"). In at least one embodiment of the invention, the Avail_Power equals the power budget of the execution unit 106a ("EX_Power_Budget", stored, for example, in the register 210 of the local power controller 110a) minus any power that is required to finish an instruction from a previous clock cycle that was frozen by the global power controller 108 or by the local power controller 110a (as described further below).

In step 409, the local power controller 110a determines whether the True_Power (the power required by the execution unit 106a to execute the instruction) is greater than the Avail_Power (the power available to the execution unit 106a). That is, the local power controller 110a determines whether the execution unit 106a would be over its power budget if the new instruction were executed. If not, in step 410 the local power controller 110a allows the execution unit 106a to proceed with execution of the instruction; otherwise, in step 411 the local power controller 110a prevents the execution unit 106a from executing the instruction (as described below). Execution of the instruction may be halted (frozen) before or during execution. In at least one embodiment, the local power controller 110a stores the amount of power required to finish execution of the instruction (e.g., in the register 212 of FIG. 2). This stored power amount may be employed during the calculation of a subsequent Avail_Power for the execution unit 106a (step 408).

Figure 5:
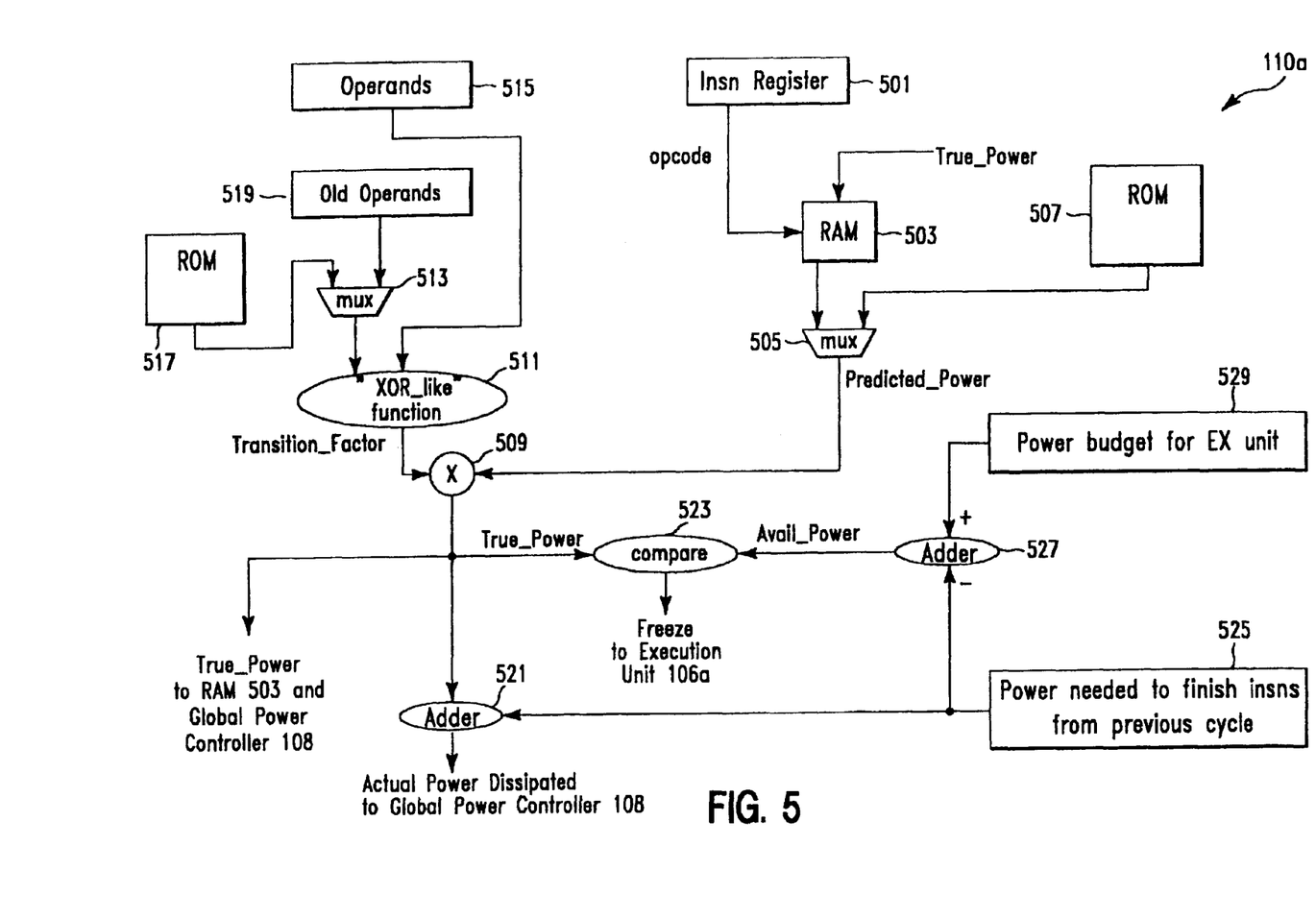
FIG. 5 is a more detailed, exemplary embodiment of one of the local power controllers of FIGS. 1 and 2.

FIG. 5 is a more detailed, exemplary embodiment of the local power controller 110a of FIGS. 1 and 2. With reference to FIG. 5, the local power controller 110a includes (1) a first register 501 coupled to a RAM 503; (2) a first multiplexer 505 coupled to the RAM 503, to a first ROM 507 and to a multiplier 509; (3) an XOR-like logic circuit 511 coupled to the multiplier 509, to a second multiplexer 513 and to a second register 515; and (4) a second ROM 517 and a third register 519 coupled to the second multiplexer 513. The local power controller 110a also includes (1) a first adder 521 coupled to the multiplier 509, to a comparator 523 and to a fourth register 525; and (2) a second adder 527 coupled to the comparator 523 and to a fifth register 529. The registers 501, 515, 519, 525 and 529 may comprise one or more conventional registers such as one or more RAMs. The XOR-like logic circuit 511 may comprise any conventional comparison circuitry, such as an XNOR logic circuit, as may the comparator 523. The multiplexers 505 and 513, the multiplier 509 and the adders 521 and 527 may comprise any known, suitable logic circuitry.

In operation, when an instruction is received by the execution unit 106a, the instruction is stored in the first register 501, and the local power controller 110a determines a Predicted_Power for execution of the instruction by the execution unit 106a as previously described. In the embodiment of FIG. 5, the Predicted_Power is determined in one of two ways: (1) by using the power that was consumed by the execution unit 106a the last time that the instruction was executed; or (2) by using a power determined by simulation (as previously described). Specifically, the local power controller 110a determines whether the instruction received by the execution unit 110a has been received by the execution unit 106a previously. If so, the local power controller 110a determines a Predicted_Power for the instruction by using the opcode for the instruction as an address for the first RAM 503 (the power consumed by the execution unit the last time that the instruction was executed being stored in the RAM 503 at the address identified by the opcode); otherwise the Predicted_Power is provided from simulated power data stored in the first ROM 507. The first multiplexer 505 is employed to the select and deliver the appropriate Predicted_Power to the multiplier 509.

Before, during or after the local power controller 110a determines the Predicted_Power, the local power controller 110a also determines the Transition_Factor for the operands that accompany the instruction received the execution unit 106a. The Transition_Factor is computed by performing an XOR-like function, such as an XNOR or other comparison operation, between the operands that accompany the instruction and either the operands employed the last time that the instruction was executed (e.g., Last_Operands stored in the register 519) or typical operands employed during simulation (e.g., Last_Operands stored in the ROM 517). The second multiplexer 513 is employed to select and deliver the appropriate Last_Operands to the XOR-like circuit 511. The XOR-like circuit 511 then outputs the result of its XOR-like operation (the Transition_Factor) to the multiplier 509.

The mutiplier 509 calculates the actual power required to execute the instruction ("True_Power") based on the Predicted_Power by multiplying the Predicted_Power by the Transition_Factor. The local power controller 110a stores the True_Power in the RAM 503 and the operands for the current instruction in the register 519 for use the next time that the instruction is executed by the execution unit 106a. The multiplier 509 outputs the True_Power to the first adder 521, to the global power controller 108, to the comparator 523 and to the RAM 503.

The local power controller 110a also calculates the available power that the execution unit 106a may use during the current clock cycle (Avail_Power) by subtracting any power that is required to finish an instruction from a previous clock cycle that was halted or frozen by the global power controller 108 or by the local power controller 110a (stored in the register 525) from the power budget of the execution unit 106a (stored in the register 529). The subtraction operation is performed via the adder 527, and the resulting Avail_Power is provided to the comparator 523 by the adder 527. If the comparator 523 determines that the True_Power (the power required to perform the current instruction) exceeds the Avail_Power (the power budget of the execution unit, corrected by the power required to complete any instruction execution that was frozen), then the local power controller 110a freezes operation of the execution unit 106a. The local power controller 110a may notify the global power controller 108, and the global power controller 108 may re-assign the instruction to another execution unit. Alternatively, the local power controller 108 may store the amount of power required to finish execution of the instruction within the register 525. If the True_Power does not exceed the Avail_Power, the local power controller 110a allows the execution unit 106a to perform the instruction (and notifies the global power controller 108 of the same). One embodiment for freezing execution of an instruction by an execution unit is described below with reference to FIG. 7.

The adder 521 determines the actual power that will be dissipated by the execution of the instruction by the execution unit 106a ("Actual Power Dissipated") by adding the True_Power to the power needed to finish any frozen instruction (stored in register 525). The Actual Power Dissipated is provided to the global power controller 108 as described below with reference to FIG. 6. The local power controllers 110b–n may be configured similarly to the local power controller 110a of FIG. 5. The control logic required to implement the above functions may be developed by a person of ordinary skill in the relevant art, and is not described in detail herein.

Figure 6:
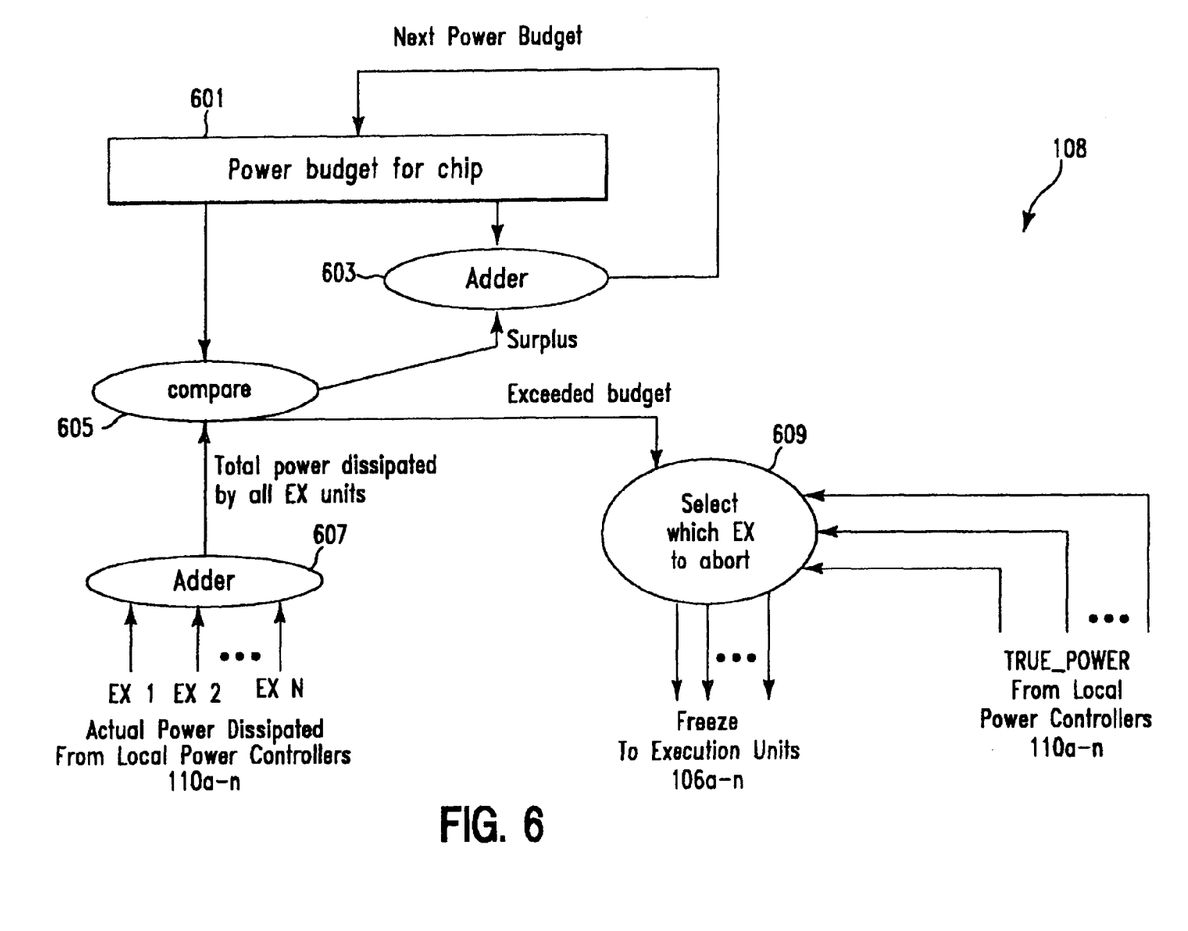
FIG. 6 is a more detailed, exemplary embodiment of the global power controller of FIGS. 1 and 2, that may be employed with the local power controller of FIG. 5.

FIG. 6 is a more detailed, exemplary embodiment of the global power controller 108 of FIGS. 1 and 2, that may be employed with the local power controller 110a of FIG. 5. With reference to FIG. 6, the global power controller 108 includes a first register 601 coupled to a first adder 603 and to a comparator 605. The comparator 605 also is coupled to a second adder 607 and to a selection circuit 609. The register 601, the adders 603 and 607, the comparator 605 and the selection circuit 609 may comprise any known, suitable logic circuitry.

In operation, the global power controller 108 computes the total power to be dissipated by the data processing system 100 for the current clock cycle by employing the second adder 607 to add together the "Actual Power Dissipated" information received from each local power controller 110a–n (e.g., the power that will be dissipated by each execution unit 106a–n as previously described). This total power represents the Total_Chip_Power for the data processing system 100. The comparator 605 then compares the power budget for the data processing system 100 (Chip_Power_Budget, stored in the register 601) to the Total_Chip_Power. If the Total_Chip_Power is less than the Chip_Power_Budget, the global power controller 108 allows each execution unit 106a–n to execute instructions without interference from the global power controller 108. Any "surplus" power (e.g., the amount by which the Chip_Power_Budget exceeds the Total_Chip_Power) is added to the Chip_Power_Budget via the adder 603 (e.g., increasing the power budget for the data processing system 100 during the next clock cycle). Rather than adding the surplus power to the Chip_Power_Budget, the global power controller 108 may restart one or more of the execution units 106a–n that have been previously frozen.

If the Total_Chip_Power is greater than the Chip_Power_Budget (as determined by the comparator 605), then the global power controller 108 (via selection circuit 609) selects one or more execution units 106a–n and freezes execution of instructions by the selected execution units. The selection of the particular execution unit or units to freeze may be based on any relevant factor. In at least one embodiment, the selection circuit 609 selects the appropriate combination of execution units to freeze based on the power to be consumed by each execution unit 106a–n during the current cycle (e.g., based on the True_Power of each execution unit 106a–n). Other factors include the number of execution units to be frozen, the type of instruction being executed by an execution unit, etc. For example, the global power controller 108 may choose to freeze only speculative execution units (described in previously incorporated U.S. Pat. No. 6,167,524). The control logic required to implement the above functions may be developed by a person of ordinary skill in the relevant art, and is not described in detail herein.

Figure 7:
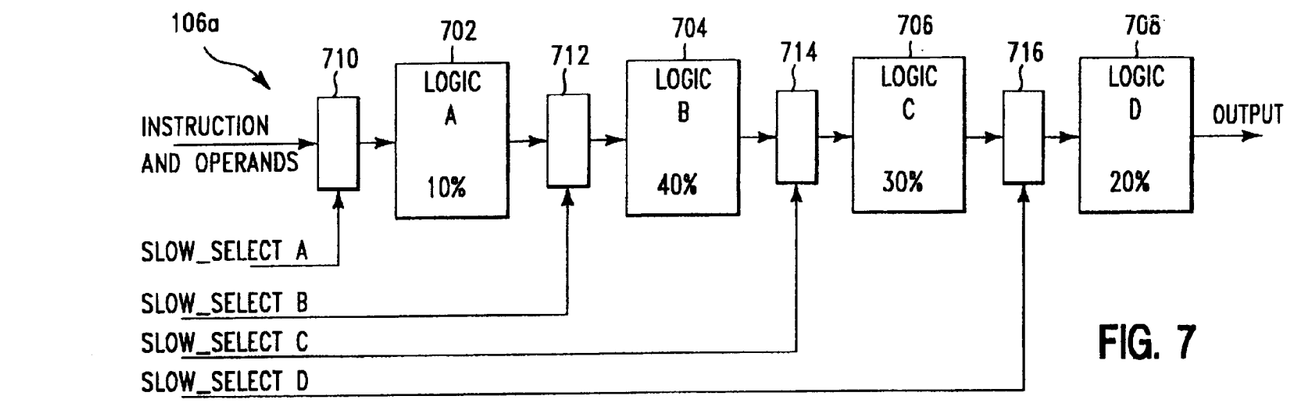
FIG. 7 is an exemplary embodiment of logic circuitry of one of the execution units of FIG. 1 useful in explaining the operation of the data processing system of FIG. 1.
Figure 8:
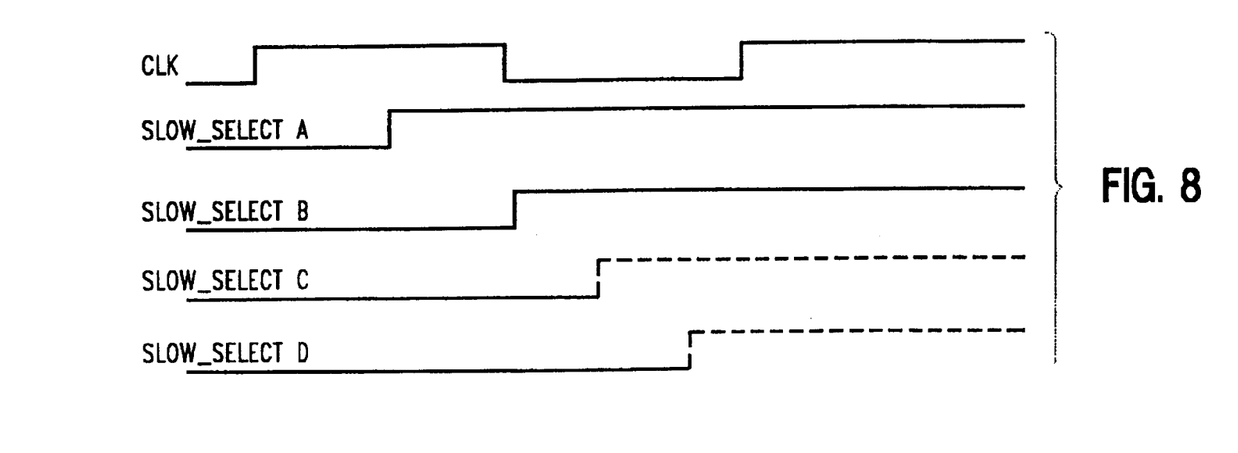
FIG. 8 is a timing diagram useful in explaining the operation of the execution unit of FIG. 7.

FIG. 7 is an exemplary embodiment of logic circuitry of the execution unit 106a of FIG. 1 useful in explaining the operation of the data processing system 100 of FIG. 1. It will be understood that other logic circuitry may be employed by any of the execution units 106a–n, and that the logic circuitry of FIG. 7 is merely exemplary.

With reference to FIG. 7, the execution unit 106a includes four logic units 702, 704, 706 and 708. Each logic unit may comprise any conventional logic circuitry adapted to process the instructions and operands employed by the data processing system 100. In the embodiment of FIG. 7, the first logic unit 702 consumes about 10% of the total power of the execution unit 106a, the second logic unit 704 consumes about 40% of the total power of the execution unit 106a, the third logic unit 706 consumes about 30% of the total power of the execution unit 106a and the fourth logic unit 708 consumes about 20% of the total power of the execution unit 106a. These percentages are merely exemplary. The local power controller 110a may be pre-programmed with a knowledge of these percentages. Such information may be stored, for example, in a ROM.

Each logic unit 702–708 is preceded by a "transition-once" buffer or multiplexer ("transition-once logic") 710, 712, 714 and 716, respectively. Transition-once multiplexers are described in detail in previously incorporated U.S. Pat. No. 6,054,877. Transition-once buffers may be similarly configured (e.g., without the additional logic required for selecting between multiple inputs). Assuming that the transition-once logic 710, 712, 714 and 716 each comprise a transition-once buffer, each transition-once buffer 710–714 is provided with a slow select input and a pass gate/latch (not shown) that holds its value when not selected by the slow select input (e.g., when the slow select input is "inactive").

In operation, in response to a "freeze" signal generated by either the local power controller 110a (e.g., in step 411 of process 400 of FIG. 4) or by the global power controller 108 (e.g., in step 304 of process 300 of FIG. 3), the local power controller 110a disables one or more of the slow select inputs of the transition-once logic 710, 712, 714 and 716. For example, if the local power controller 110a is to prevent the execution unit 106a from consuming any power, the slow select inputs of all transition-once logic 710–716 may be disabled. In this manner, any instruction and operands provided to the execution unit 106a are "held" by the transition-once logic 710. The instruction and operands may be allowed to propagate through the execution unit 106a at any subsequent time by enabling the slow select inputs of the transition-once logic 710–716. The global power controller 108 may be provided with direct control over the slow select inputs of the transaction-once logic 710–716.

As another example, assume that an instruction and operands have been allowed to propagate through both the logic unit 702 and the logic unit 704 through appropriate selection of the slow select inputs of the transition-once logic 710 and 712. If the local power controller 110a then freezes operation of the execution unit 106a (e.g., in response to a freeze signal from either the local or global power controller 110a, 108), no "active" slow select input is provided to the transition-once logic 714 and 716. This is illustrated, for example, in the timing diagram of FIG. 8 which shows a reference clock signal (CLK), the slow select input applied to the transition-once logic 710 (slow_select A), the slow select input applied to the transition-once logic 712 (slow_select B), the slow select input applied to the transition-once logic 714 (slow_select C) and the slow select input applied to the transition-once logic 716 (slow_select D). With the slow select inputs to the transition-once logic 714 and 716 held inactive, the instruction and operands applied to the execution unit 106a propagate only through the logic units 702 and 704. The resultant output of the logic unit 704 is held by the transition-once logic 714. The processing of the instruction and operands may be continued at a subsequent time by proper activation of the slow select inputs of the transition-once logic 714 and 716. Note that execution of the instruction and operands may start where execution was frozen, without requiring reprocessing through logic units 702 and 704. A significant power savings thereby may be realized.

In the example above, approximately 50% of the power required for the execution unit 106a to process the instruction and operands has been consumed. In at least one embodiment of the invention, this information is stored in the register 525 of FIG. 5. For example, assume that the total power that the execution unit 106a will consume executing an instruction is 0.2 Watts. If only the slow select inputs of the transition-once logic 710, 712 are active, the local power controller 110a may determine that about 0.1 Watts of power has been consumed by the execution unit 106a, and that an additional 0.1 Watts of power will be required for the execution unit 106a to complete its processing of the instruction.

It will be understood that through use of the present invention, the power dissipation of the data processing system 100 may be regulated very quickly and accurately as power consumption by instructions and operands may be monitored at every clock cycle and adjusted as desired (e.g., to maintain a steady current drain of a power supply). For example, in at least one embodiment of the invention, the global power controller 108 calculates the total power dissipated by all of the execution units 106a–n (e.g., as provided by the local power controllers 110a–n) and attempts to maintain the total power constant. This may be achieved, for example, by (1) temporarily suspending the dispatching of new instructions to one or more of the execution units 106a–n; and/or (2) temporarily freezing execution of instructions by one or more of the execution units 106a–n (e.g., step 304 in process 300 of FIG. 3). When execution of a halted/frozen instruction resumes, the execution resumes from where execution was halted (e.g., as described previously with reference to FIGS. 7 and 8). Instruction execution thus may be "paused" and restarted at nearly any point during execution.

As stated above, each local power controller 110a–n may "predict" the per-cycle power that will be dissipated by each instruction and operands, and may compare the per-cycle power to a power budget for the relevant execution unit 106a–n. In at least one embodiment of the invention, if the power budget for an execution unit will be exceeded by execution of a particular instruction, the relevant local power controller 110a–n removes the instruction from the execution unit's pipeline. Execution of instructions by the execution unit may be halted (e.g., by inactivating slow select inputs of the execution unit), and the global power controller 108 may be notified that the execution unit cannot execute the instruction in this cycle. The global power controller 108 may reassign the instruction to another execution unit, and may restart the halted execution unit for processing of a subsequent instruction. In one embodiment of the invention, all calculations and/or data manipulations (e.g., calculations/determinations of Predicted_Power, Last_Operands, True_Power, Avail_Power, the various comparisons therebetween, etc.) occur in a single clock cycle so that a decision may be made quickly as to whether to allow an instruction to be executed. In yet another embodiment, each local power controller 110a–n may only freeze execution of an instruction by an execution unit at the beginning of a clock cycle, while the global power controller 108 may freeze execution of the instruction mid-cycle (e.g., if the global power controller 108 determines that the power budget of the data processing system 100 will be exceeded if execution of the instruction is allowed to continue). Dynamic, real-time power control is provided to the data processing system 100.

The foregoing description discloses only exemplary embodiments of the invention; modifications of the above disclosed apparatus and method which fall within the scope of the invention will be readily apparent to those of ordinary skill in the art. For example, simulated or actual power consumption data at multiples stages within an execution unit may be stored by the local power controllers 110a–n if desired.

Accordingly, while the present invention has been disclosed in connection with exemplary embodiments thereof, it should be understood that other embodiments may fall within the spirit and scope of the invention, as defined by the following claims.

What is claimed is:

1. A method of conserving power in a processing integrated circuit, the method comprising the steps of:

calculating actual power consumption for executing an instruction and data corresponding to the instruction by:
determining a predicted power based on an amount of power that was consumed when the instruction was executed previously;
determining data corresponding to the instruction executed previously; and
calculating actual power consumption for the instruction to be executed based on the predicted power and the data corresponding to the instruction executed previously; and
executing the instruction if such execution does not exceed a predetermined power level.

2. The method of claim 1 wherein calculating actual power consumption comprises:

comparing the data corresponding to the instruction to be executed to the data corresponding to the instruction executed previously so as to generate a transition factor; and modulating the predicted power with the transition factor.

3. The method of claim 2 wherein modulating the predicted power comprises multiplying the predicted power by the transition factor.

4. The method of claim 1 further comprising storing the calculated actual power consumption and data corresponding to the instruction.

5. A method of conserving power in a processing integrated circuit, the method comprising the steps of:

calculating actual power consumption for executing an instruction and data corresponding to the instruction by:
determining a predicted power based on an amount of power obtained from simulation of execution of the instruction;
determining data employed during the simulation; and
calculating actual power consumption for the instruction to be executed based on the predicted power and the data employed during the simulation; and
executing the instruction if such execution does not exceed a predetermined power level.

6. The method of claim 5 wherein calculating actual power consumption comprises:
    comparing the data corresponding to the instruction to be executed to the data employed during simulation so as to generate a transition factor; and
    modulating the predicted power with the transition factor.

7. The method of claim 1 wherein executing the instruction if such execution does not exceed a predetermined power level comprises:
    determining an available power for an execution unit that is to execute the instruction and data;
    comparing the available power for the execution unit to the calculated actual power consumption for executing the instruction and data; and
    executing the instruction and data with the execution unit if the available power for the execution unit is greater than the calculated actual power consumption for executing the instruction and data.

8. The method of claim 7 wherein determining the available power for an execution unit comprises:
    determining a power budget for the execution unit;
    determining an amount of actual power required to finish executing an instruction and data that was partially executed by the execution unit; and
    calculating the available power for the execution unit by subtracting the amount of actual power required to finish executing the partially executed instruction and data from the power budget for the executing unit.

9. A method of conserving power in a processing integrated circuit, the method comprising the steps of:
    calculating actual power consumption for executing an instruction and data corresponding to the instruction;
    determining a power budget for an execution unit;
    determining an amount of actual power required to finish executing an instruction and data that was partially executed by the execution unit;
    calculating an available power for the execution unit based on the amount of actual power required to finish executing the partially executed instruction and data and the power budget for the execution unit;
    comparing the available power for the execution unit to the calculated actual power consumption for executing the instruction and data; and
    executing the instruction and data with the execution unit if the available power for the execution unit is greater than the calculated actual power consumption for executing the instruction and data.

10. A method of conserving power in a processing integrated circuit employing a plurality of execution units, the method comprising the steps of:
    comparing a total actual power to be consumed by the processing integrated circuit to a power budget for the processing integrated circuit; and
    if the total actual power exceeds the power budget, freezing execution of an instruction by one of the plurality of execution units so as to allow execution of the instruction to continue at a later time from where execution was frozen.

11. The method of claim 10 wherein comparing a total actual power to be consumed by the processing integrated circuit to a power budget for the integrated circuit comprises:
    determining a total actual power to be consumed by the processing integrated circuit during a clock cycle; and
    determining a power budget for the processing integrated circuit.

12. The method of claim 11 wherein determining a total power comprises:
    from each execution unit, receiving information regarding actual power to be consumed by the execution unit during the clock cycle; and
    determining the total actual power based on the information received from the execution units.

13. The method of claim 10 wherein freezing execution of an instruction by one of the plurality of execution units comprises holding inactive at least one slow select input of transition—once logic of the execution unit.

14. An execution unit for a data processing system comprising:
    a local power controller adapted to:
        calculate actual power consumption for executing an instruction and data corresponding to the instruction by:
            determining a predicted power based on an amount of power that was consumed when the instruction was executed previously;
            determining data corresponding to the instruction executed previously; and
            calculating actual power consumption for the instruction to be executed based on the predicted power and the data corresponding to the instruction executed previously; and
        allow the execution unit to execute the instruction if such execution does not exceed a predetermined power level.

15. The execution unit of claim 14 wherein the local power controller comprises first calculation logic adapted to calculate actual power consumption for executing the instruction and data corresponding to the instruction based on:
    an amount of power consumed when the instruction was executed by the execution unit previously; and
    operands of the instruction when the instruction was executed by the execution unit previously.

16. The execution unit of claim 15 wherein the local power controller further comprises:
    a first register adapted to store first information regarding an amount of power consumed when the instruction was executed by the execution unit previously; and
    a second register adapted to store second information regarding operands of the instruction when the instruction was executed by the execution unit previously;
    wherein the first calculation logic is adapted to calculate actual power consumption for executing the instruction and data corresponding to the instruction on the contents of the first and second registers.

17. The execution unit of claim 15 wherein the local power controller further comprises second calculation logic adapted to compute a power available for executing the instruction and data.

18. The execution unit of claim 17 wherein the local power controller further comprises:
    a first register adapted to store a power budget for the execution unit; and
    a second register adapted to store a actual power required to finish execution of a previous instruction;
    wherein the second calculation logic is adapted to compute the power available for executing the instruction and data based on the contents of the first and second registers.

19. The execution unit of claim 17 wherein the local power controller comprises comparison circuitry adapted to:
   compare actual power consumption for executing the instruction and data corresponding to the instruction to power available for executing the instruction and data; and
   freeze execution of the instruction and data if the actual power consumption for executing the instruction and data corresponding to the instruction exceeds the power available for executing the instruction and data.

20. The execution unit of claim 17 further comprising transition-once logic having at least one slow select input and wherein the local power controller is adapted to hold the at least one slow select input inactive if the actual power consumption for executing the instruction and data corresponding to the instruction exceeds the power available for executing the instruction and data.

21. A global power controller for conserving power in a processing integrated circuit employing a plurality of execution units, the global power controller comprising:
   a comparator circuit adapted to compare a total actual power to be consumed by the processing integrated circuit to a power budget for the processing integrated circuit; and
   a selection circuit adapted to select an execution unit in which to freeze execution of an instruction so as to allow execution of the instruction to continue at a later time from where execution was frozen if the total actual power exceeds the power budget.

22. The global power controller of claim 21 further comprising an adder circuit adapted to receive information regarding actual power to be dissipated during a clock cycle from each of the plurality of execution units and to calculate the total actual power to be consumed by the processing integrated circuit based on the received information.

23. The global power controller of claim 21 further comprising an adder circuit adapted to add to the power budget any amount of power by which the power budget exceeds the total actual power.

24. The global power controller of claim 21 wherein the selection circuit is further adapted to select an execution unit that was previously frozen to continue execution if the total actual power is less than the power budget.

25. A data processing system comprising:
   a global power controller comprising:
      a comparator circuit adapted to compare a total actual power to be consumed by the processing integrated circuit to a power budget for the processing integrated circuit; and
      a selection circuit adapted to select an execution unit in which to freeze execution of an instruction so as to allow execution of the instruction to continue at a later time from where execution was frozen if the total actual power exceeds the power budget;
   a plurality of execution units each comprising:
      a local power controller that is in communication with the global power controller and that is adapted to:
         calculate actual power consumption for executing an instruction and data corresponding to the instruction;
         communicate actual power consumption information to the global power controller; and
         allow the execution unit to execute the instruction if such execution does not exceed a predetermined power level and if the execution by the execution unit is not frozen by the global power controller.

26. The system of claim 25 wherein the global power controller is adapted to reassign execution of an instruction and data to another execution unit if execution by a first execution unit to which the instruction and data was assigned is frozen by a local power controller of the first execution unit.

27. An execution unit for a data processing system comprising:
   a local power controller adapted to:
      calculate actual power consumption for executing an instruction and data corresponding to the instruction by:
         determining a predicted power based on an amount of power obtained from simulation of execution of the instruction;
         determining data employed during the simulation; and
         calculating actual power consumption for the instruction to be executed based on the predicted power and the data employed during the simulation; and
      allow the execution unit to execute the instruction if such execution does not exceed a predetermined power level.

* * * * *